Figure 1:
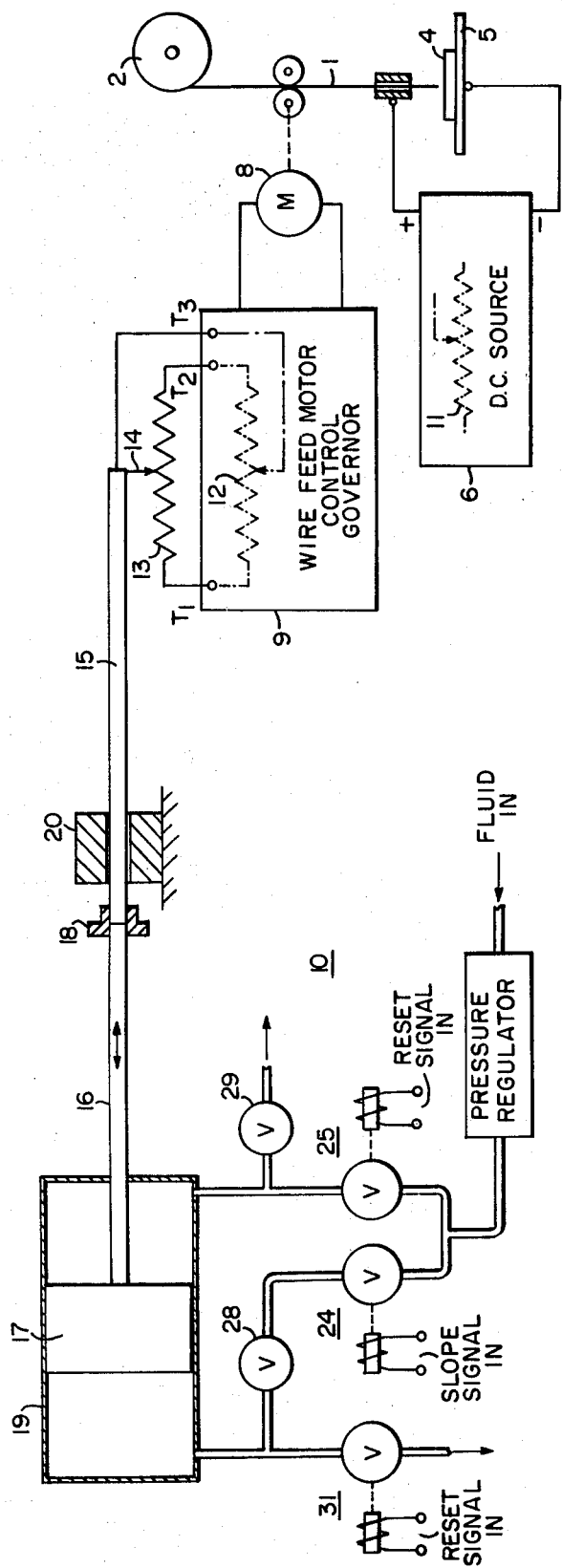

United States Patent

Urbanic

[15] 3,686,465
[45] Aug. 22, 1972

[54] AUTOMATIC SLOPE CONTROL ARRANGEMENT FOR WELDING APPARATUS

[72] Inventor: John M. Urbanic, Pittsburgh, Pa.

[73] Assignee: Aluminum Company of America, Pittsburgh, Pa.

[22] Filed: March 25, 1971

[21] Appl. No.: 127,918

[52] U.S. Cl. .....................219/131 F, 314/68, 338/39
[51] Int. Cl.......B23k 9/10, H05b 31/18, H01c 13/00
[58] Field of Search.......219/131, 131 F; 314/61, 62, 314/68; 338/39; 323/95

[56] References Cited

UNITED STATES PATENTS

| | | | |
|---|---|---|---|
| 2,532,410 | 12/1950 | Kennedy | 219/131 F |
| 2,933,592 | 4/1960 | Bichsel | 219/131 F |
| 3,118,051 | 1/1964 | Dixon | 219/135 |
| 779,720 | 1/1905 | Lacey | 338/39 |
| 3,048,692 | 8/1962 | Bichsel et al. | 219/131 F |
| 3,496,327 | 2/1970 | Vilkas | 219/131 F |

*Primary Examiner*—William H. Beha, Jr.
*Attorney*—Elroy Strickland

[57] ABSTRACT

A combination providing a control device for automatically changing the rate at which a consumable welding material is fed to a weld area to eliminate crater cracking. The combination comprises a potentiometer having a sliding contact arm mechanically connected to be moved by a means operated by pressurized fluid. Operation of the fluid means is effected automatically by means capable of directing fluid thereto at a controlled, changing rate to provide a controlled, gradual change in the resistance of the potentiometer. Such control of the potentiometer is effective to provide a controlled, gradual change in the rate at which the welding material is fed to the weld area.

1 Claim, 2 Drawing Figures

Patented Aug. 22, 1972

3,686,465

INVENTOR
John M. Urbanic
BY E. Strickland
ATTORNEY

AUTOMATIC SLOPE CONTROL ARRANGEMENT FOR WELDING APPARATUS

BACKGROUND OF THE INVENTION

The present invention relates generally to the automatic regulation of the output of a motor power supply, and particularly to an arrangement in which the level of an output voltage is altered, between two selected limits, in a gradual, sloping manner upon receipt of signal during a welding cycle.

In welding operations, it is often desirable to change the rate at which consumable welding material is fed to the weld area in order to provide a desired change in the welding process. For example, in terminating a weld in which the weld area is a closed path, the welding material is preferably lapped at the termination to insure completion of the path and weld. In electric arc welding apparatus in which the welding material is a consumable electrode, with an abrupt termination of weld power and the arc a crater is created in the weld at the location of its termination, which upon solidification, tends to crack because of the rapid cooling and thus contraction of the weld material, thereby resulting in a defective weld. Such a defect is always undesirable because it provides a beginning for further breaking. A crater crack in a welded member subjected to cyclic stresses and fatigue tends to increase in size with such stresses.

BRIEF SUMMARY OF THE INVENTION

Briefly, the present invention provides a convenient and economical means for automatically, gradually changing the heat input or weld power to a welding arc to control solidification of the weld material while simultaneously providing a controlled addition of the same. This controlled solidification and addition reduces the tendency of the weld material to form the crater and to crack because of too rapid cooling and contraction of the material.

This is accomplished, broadly, by use of a potentiometer electrically connected in the circuit of a power source of a wire feed mechanism, such as a direct current motor, for feeding consumable electrode material to the weld area. The sliding contact arm of the potentiometer is mechanically connected to a piston supported within a cylinder, the piston serving to move the arm between two selected positions on the resistance element of the potentiometer when pressurized fluid is directed to the cylinder. The fluid directed to the cylinder is automatically controlled by two valves capable of respectively changing the rate at which the piston moves the sliding arm in a first direction at a selected time during the welding cycle, and thereafter rapidly returning the arm to its original position at the end of a selected period of time for a repeat of the arm movement in the first direction.

Such an arrangement is particularly useful to control the overlap of weld material at the end of a weld cycle involving a closed path weld area though the invention is not limited thereto. By a controlled gradual reduction in the rate at which the weld material is fed to the area of the overlap, a reduction in welding current (and thus head if the welding arc voltage remains constant as provided by a welding power supply) is inherently produced since the current required to melt a length of the electrode for a given unit of time is reduced accordingly.

The invention, as briefly described, is made from low cost, readily available components, and it is further a highly flexible device. Many commercial wire feed motor power supplies use a manually operated potentiometer to adjust electrode feed rate. With the use of the present invention, the manually operated potentiometer is simply disconnected, and the potentiometer of the invention connected in its place.

With a welding power supply having a constant output potential with changes in welding load, only a single device of the invention is required to control the electrode feed rate, and thus only one substitution of the potentiometer is required. However, with the welding power supplies having a "drooping" or varying volt-ampere characteristic, i.e., a power source in which changes in welding arc current result in a reciprocal change in the arc voltage, a second device of the invention is required. Due to this varying volt-ampere characteristic, the total power at the arc will remain essentially constant, thereby offsetting the reduction in welding current caused by the reduction in electrode feed speed. With such a welding power supply, a second device of the invention can be conveniently employed to down slope the terminal voltage (which, with a corresponding reduction in welding current, actually maintains the terminal voltage constant) to obtain a net reduction in welding power.

THE DRAWING

Figure 2:
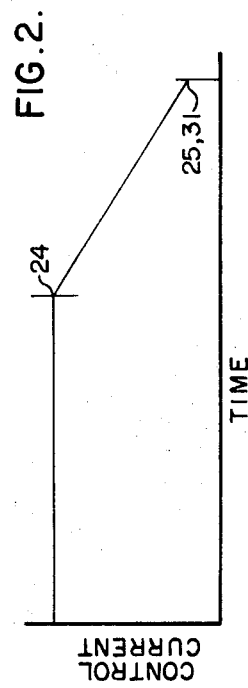

The invention, along with its advantages and objective will be more apparent upon consideration of the following detailed description in connection with the accompanying drawing in which:

FIG. 1 is a schematic representation of a sloping control device constructed in accordance with the principles of the present invention; and FIG. 2 is a welding time versus current curve showing the operation of the device of FIG. 1.

PREFERRED EMBODIMENT OF THE INVENTION

Referring now to the drawing, FIG. 1 shows diagrammatically a combination of components generally designated 10, which function as a device to change the rate at which a welding material 1, such as a consumable electrode wire wound a reel 2 is fed to a welding area and workpiece 4 to be welded. The workpiece is shown supported on a worktable 5, and a direct current constant potential power source 6 is connected between the wire and workpiece to supply welding power to a welding arc (not shown) between the end of the wire and the workpiece. The wire 1 is fed to the weld area by a wire feed mechanism represented in the drawing by a motor 8, the speed of which is controlled by an associated power source 9, such as an electronic governor, the motor, the motor governor and the welding power source 6 comprising devices that are well known and commercially available in the welding industry. Such devices, i.e., the welding power supply and motor governor, are usually provided with potentiometers such as 11 and 12 as shown in dash outline in the power supply 6 and governor 9 respectively, for manually controlling the power outputs thereof. By adjustment of the potentiometer in the governor, it has been possible to set the speed of the motor 8 at a desired RPM and thereby control the speed of wire 1 feed to the weld area. Similarly, the power supplied to the welding arc has been properly set by appropriate manual adjustment of the power supply 6.

In accordance with the present invention, control of wire 1 feed rate is made automatic by the simple exchange of the manually operated potentiometer 12 for an automatically controlled potentiometer 13 of the combination 10. The exchange is made by simply disconnecting the potentiometer 12 from terminals $T_1$, $T_2$ and $T_3$ of the governor and connecting the potentiometer 13 in its place.

The potentiometer 13 has a sliding contact arm 14 suitably attached to one end of a shaft 15. The other end of the shaft is abutted against the end of a shaft 16 of a piston 17 and mechanically connected together by a collar 18 fixed to the abutting ends. The piston 17 is located within a cylinder 19 for sliding movement therein.

Adjacent or astraddle the shaft 15 is an adjustable stop means 20 for engaging the collar 18 for stopping the movement thereof in the direction of the stop means.

A first solenoid valve 24 is connected in fluid communication with the end of the cylinder 19 behind the piston 17, which, in the drawing is the left hand end of the cylinder. The other (right hand) end of the cylinder is connected in fluid communication to a second solenoid valve 25. The solenoid valves are, in turn, connected to a source (not shown) of pressurized fluid, such as air, through a pressure regulating device 26 providing constant fluid pressure for the operation of the fluid operated means as thus far described.

Between the solenoid valves 24 and 25 and the respective ends of the cylinder 19, are connected respectively two metering valves 28 and 29. A third solenoid valve 31 is connected to the end of the cylinder to which the solenoid and metering valves 24 and 28 are connected.

The solenoid and metering valves employed in the present invention are commercially available devices. A variety of such devices are available for operation with various fluids and pressures and, in the case of the solenoid valves, for energization at various voltage and current values. In the present invention, valves operable on a plant source of pressurized air are preferred though other fluids and fluid supplies may be used.

In the operation of the combination 10, the piston 17 is positioned to the rear of the cylinder 19, and a mounting base (not shown) of the potentiometer 13 is moved to obtain a resistance value that will operate the motor 8, and thus feed the electrode wire 1, at a desired, fixed speed that will provide a substantially constant weld current and heat for the welding arc. As explained above, the rate of the wire speed determines the current and heat required to melt a unit length of the wire per unit of time. Since the potentiometer is adjusted for this purpose, the resistance element of the potentiometer has a linear configuration so that the adjustment thereof is easily effected. This constant welding current is pictorially shown in FIG. 2 as the horizontal line above the time (base) line of the current-time curve.

With the potentiometer adjusted for the desired speed of wire feed, and a workpiece 4 suitably positioned on the worktable 5, the power supply 6 and the motor governor 9 are energized to begin a welding operation and cycle. If the weld area is a closed path, it is desirable, as explained earlier, to overlap the weld material at the completion of the cycle in a gradually decreasing manner to effect a gradual solidification of the weld material with a controlled addition of material to avoid crater cracking and thereby maintain the integrity of the weld throughout the closed path.

To effect such a weld at a selected time during the weld cycle, for example, at substantially the beginning of the overlap, the valve of the solenoid valve 24, which is normally closed, is opened by energization of its solenoid to direct a flow of pressurized fluid to the cylinder 19 through the metering valve 28. The solenoid is energized by directing a signal thereto at the time it is desired to begin the reduction in the feed of the welding wire 1. In FIG. 2, this time is indicated by numeral 24 (corresponding to the solenoid valve 24) on the current-time curve. Energization of the solenoid valve can be accomplished by a suitable timing device, or by use of a limit switch suitably positioned to be closed by say rotation of the table 5 as it moves the workpiece 4 to effect a closed weld path. During this period of time, the solenoid valves 25 and 31 are closed so that the fluid is directed behind the piston 17 to move it in the direction of the potentiometer 13, with any fluid or air trapped in the front of the piston escaping through the metering valve 29.

The metering valves 28 and 29 control the rate at which the piston 17 and thus the potentiometer 13 are moved, and, in this manner, control the rate of decrease in the speed of the motor 8 and thus the speed at which wire 1 is fed to the welding area. This rate is selected and fixed by manual adjustment of the valves, the valves each having an adjustable orifice through which the fluid is directed. The slope begins at time 24 as pictured in FIG. 2.

The degree of the change, i.e., the angle of slope from the wire feed rate at which welding operation takes place before beginning the overlap of weld material, as set by the position of the potentiometer resistance in relation to the cylinder 19, is a function of the fluid pressure applied to the system via the regulator 26 and the setting of the metering valves 28 and 29. The linear position of the adjustable stop 20 which is a second limit adjustment for the potentiometer, is adjustably fixed on a mounting base. At the end of the sloping period, the collar 18 abuts against the stop 20 to arrest the forward movement of the piston and potentiometer arm.

When the collar 18 reaches the stop 20, at the end of the sloping period, the slope signal is removed from the solenoid valve 24 thereby closing the same and a signal is applied to the solenoids of the solenoid valves 25 and 31 which open the valves. The time of this is indicated in Fig. 2 by the numerals 25, 31. With the opening of valve 25, fluid is directed to the front (right) end of the cylinder 19 to return and reset the piston and potentiometer arm to their original position for a repeat of the welding cycle described above. The fluid behind the piston is exhausted through the solenoid valve 31. The resetting signal may be provided by such means as a second timing device or limit switch (not shown), the contacts of which are closed upon completion of the sloping period.

With the solenoid valves 25 and 31 opened and the solenoid valve 24 closed, the welding cycle is repeated in the manner described above.

As explained above, the potentiometer is preferably a linear type so that its adjustment in relation to the cylinder 19 is more easily effected. Such potentiometers are commercially available in a variety of wattage and resistance sizes. In using the invention, the three wires electrically connecting the control potentiometer in a circuit of an existing motor power supply are simply disconnected and reconnected to the potentiometer 13 of the present invention, the potentiometer 12 being, of course, of the similar value and type as the one replaced. In this manner, any motor power supply having potentiometer control can be converted for automatic sloping control of the welding operation.

When the welding power supply used in conjunction with an automatic sloping operation in the above manner has a constant output voltage characteristic, only a single control device 10 of the invention is necessary since the power supplied to the welding arc can be changed by simply reducing current, i.e., by reducing the feed rate of the wire 1.

In cases where the welding power supply has reciprocal voltage-current characteristics, a change in welding power cannot simply be effected by changing the wire feed rate. The reciprocal change in voltage which occurs tends to keep welding power constant. With such power supplies, a second control device 10 of the invention can be employed to change the terminal voltage of the power supply providing the welding arc. If such a power supply has a potentiometer for manually controlling terminal voltage, the potentiometer is disconnected and replaced by the potentiometer 13 of the invention, and the solenoid valves 24, 25 and 31 connected to be energized in the manner described above. With two such control units 10 thus connected, welding current and welding voltage can be simultaneously reduced to provide the sloping action depicted in FIG. 2.

The invention has thus far been described in terms of a sloping decrease in weld power at the end of a weld cycle. The invention, however, is not limited to such a use. It may, for example, be employed to begin a welding cycle where a controlled gradual increase in welding power is needed.

From the foregoing description it should now be apparent that a new and useful combination of components, providing a unit for automatically changing the welding power to a welding area, has been disclosed. The combination is economical to manufacture, being made primarily from low cost, commercially available components, and easy to install in existing welding apparatus. It is further a flexible device, being capable of use with power supplies having various types of volt-ampere characteristics.

While the invention has been described in terms of preferred embodiments, the claims appended hereto are intended to encompass all embodiments which fall within the spirit of the invention.

Having thus described my invention and certain embodiments thereof, I claim:

1. A combination for use with a welding power supply having a constant potential or a varying volt-ampere characteristic for automatically and gradually changing the rate at which a consumable electrode material is fed to a weld area during a welding cycle by automatically positioning the control arm of a potentiometer electrically connected in the circuit of a power source supplying power to a means adapted to feed said electrode to the weld area, the combination comprising a potentiometer having a movable arm positioned for sliding contact with the resistance element of said potentiometer, a piston mechanically connected to the movable arm of said potentiometer, and supported within a cylinder for movement therein, adjustable means for stopping the forward movement of the movable arm of said potentiometer, first and second solenoid valves connected in fluid communication between a supply of pressurized fluid and the respective ends of said cylinder, said first solenoid valve being electrically connected to receive a signal at a selected time in the welding cycle, said signal being operative to energize said first solenoid valve and thereby to open the same for directing a flow of the pressurized fluid to said cylinder, the flow of said fluid being effective to move said piston and thus the sliding arm of said potentiometer in a manner providing a controlled, gradual change in the level of output of said power source over a selected period of time, said second solenoid valve being electrically connected to receive a second signal at the end of said period of time to reset said piston and potentiometer by directing pressurized fluid to said cylinder when said second solenoid valve is opened upon the energization thereof by the second signal, and input and exhaust metering valves connected in fluid communication with respective ends of the cylinder, said valves determining the rate of piston and potentiometer arm movement, and thus the rate at which the change in the output of the power source occurs.

* * * * *